United States Patent [19]

Balcewicz

[11] Patent Number: 5,023,619

[45] Date of Patent: Jun. 11, 1991

[54] SATELLITE COMMUNICATIONS SYSTEM

[75] Inventor: Joseph F. Balcewicz, Hightstown, N.J.

[73] Assignee: General Electric Company, East Windsor, N.J.

[21] Appl. No.: 936,499

[22] Filed: Dec. 1, 1986

[51] Int. Cl.$^5$ ............................................. H01Q 1/28
[52] U.S. Cl. .................................................... 342/361
[58] Field of Search ...................... 342/358, 359, 361; 343/756, 900

[56] References Cited

U.S. PATENT DOCUMENTS

| | | | |
|---|---|---|---|
| 4,232,321 | 11/1980 | Ohm | 342/361 |
| 4,292,685 | 9/1981 | Lee | 342/361 |
| 4,293,945 | 10/1981 | Atia et al. | 342/361 |
| 4,625,214 | 11/1986 | Parekh | 343/756 |
| 4,660,045 | 4/1987 | Clark | 342/361 |

Primary Examiner—Mark Hellner
Attorney, Agent, or Firm—William H. Meise

[57] ABSTRACT

A satellite communication system particularly suited for trans-Atlantic communications is provided wherein a communications satellite is placed in geosynchronous orbit somewhere between Western European continent and Eastern American continent. The satellite includes an antenna adapted for orthogonal linear polarization and the antenna elements oriented at an acute angle with respect to orbit normal to result in polarization arrival angles as close to local vertical and horizontal as possible at the earth stations in the high rain rate regions of southeastern United States and Mediterranian region in Europe.

8 Claims, 3 Drawing Sheets

SATELLITE COMMUNICATIONS SYSTEM

This invention relates to earth orbiting satellite communication systems transmitting RF signals in orthogonal linear polarizations to earth ground stations and, more particularly, to such satellite communication systems that are used for communications between widely separated land areas.

There is currently a considerable amount of commercial interest in Fixed-Service Satellites (FSS) systems that can be placed in geostationary orbit above the equator and stationed at a longitude over the Atlantic Ocean. From this location the satellite is in the line of sight along the western portion of the European continent and eastern portion of the North American continent. Consequently, a single antenna that includes both of these land areas in its coverage region can be designed and placed on such a satellite. This permits the satellite to relay transmissions between any two ground stations in these two coverage areas and thus provides trans-Atlantic communications. United States Regulatory agencies have recently acted to allow United States carriers to provide trans-Atlantic services, as described above, provided these services do not do "significant economic harm" to INTELSAT, the organization chartered to provide international satellite communications.

Several of the private carriers trying to establish such a trans-Atlantic satellite system have chosen the Ku-band frequency in which to operate. These frequencies are nominally in the 10.7 GHz to 14.8 OHz frequency range. One problem in using these frequencies is that the propagation through moisture and precipitation affects the quality of the received signal. These degradations manifest themselves as both a loss in signal power and a depolarization of the signal. The depolarization effect is important since these proposed satellite systems wish to re-use the allotted frequency bands by transmitting two independent signals on orthogonal polarizations. As these signals become depolarized, they no longer remain orthogonal and begin to interfere with each other. That is, a receiver designed to receive a signal on one polarization will begin to also receive some of the orthogonally polarized signal. Should the level of this cross-polarized signal become large enough it will prevent the receiver from demodulating the desired signal.

There is no way to eliminate the attenuation and depolarization effects due to moisture and precipitation, but, it is possible to minimize their impact. For U.S. domestic Ku-band satellites, such as RCA SATCOM K, the polarization at the spacecraft is rotated so that the favored orientation is achieved in the middle of the high rain rate region in the Southeastern United States. For trans-Atlantic satellites it is desirable to achieve a favored orientation through parts of the Western European continent as well.

SUMMARY OF THE INVENTION

In accordance with one embodiment of the present invention a satellite communication system is provided for providing communications between widely separated land areas wherein a satellite is placed in geosynchronous orbit above an earth's longitude between the land areas. The satellite includes an antenna oriented and arranged to result in polarization arrival angles as close to local vertical and horizontal as possible at the earth's stations in the high rain rate regions of the land areas.

DESCRIPTION OF THE PREFERRED EMBODIMENT

Figure 1:
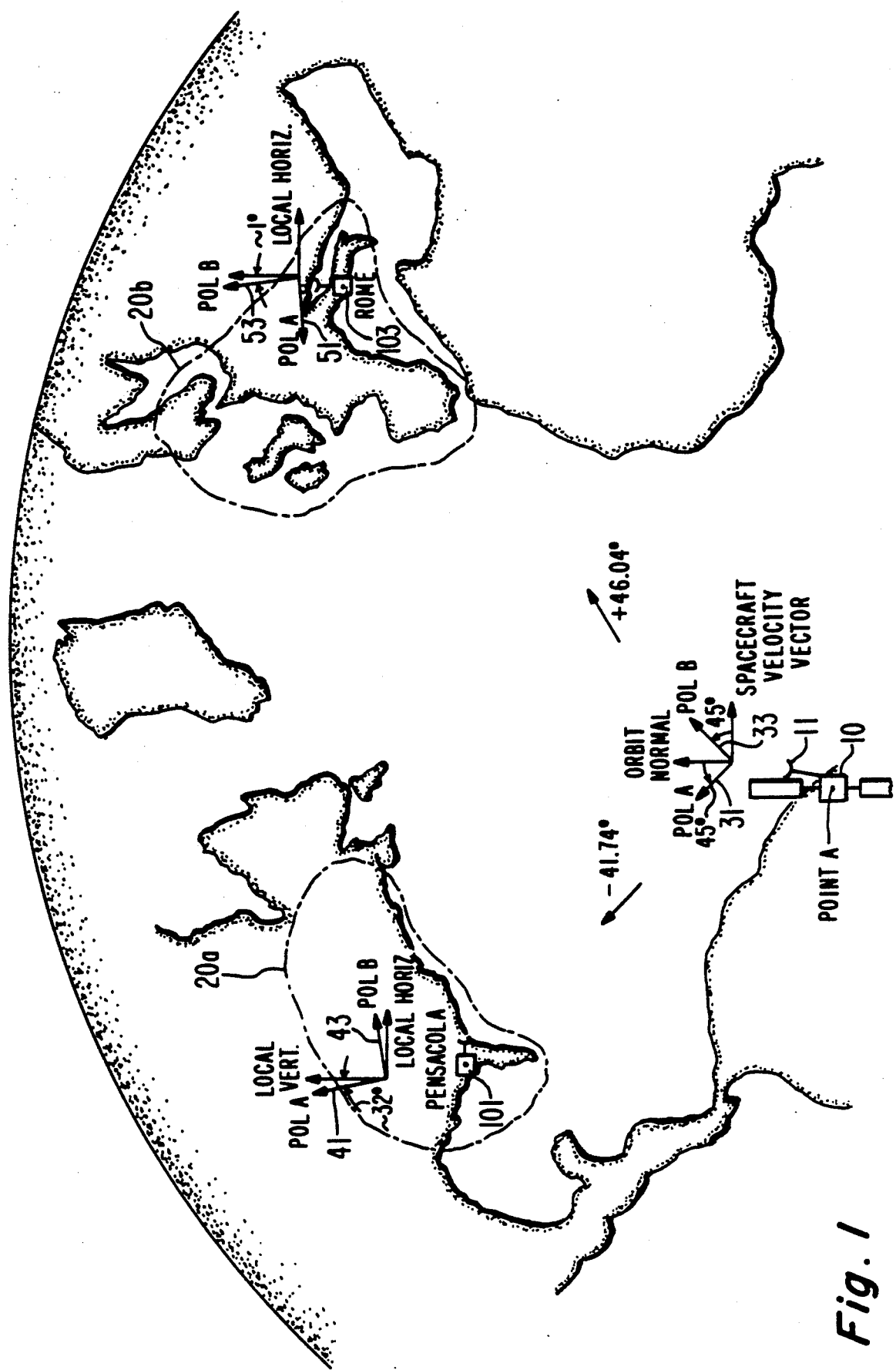
FIG. 1 illustrates a section of the earth centered in the Atlantic Ocean showing both the east coast of the United States and the west coast of Europe and schematically illustrating a satellite.

Referring to FIG. 1, there is illustrated a sketch of a section of the earth centered over the Atlantic Ocean showing both the west coast of Western Europe and the east coast of the United States and schematically a satellite 10 positioned above the equator. The satellite 10 for typical communication satellites is located in the geosynchronous orbit at 22,300 miles above the earth's equator and in order to provide pattern coverage of the desired area over Eastern United States and Western Europe the satellite would be positioned to be somewhat near the center of the Atlantic Ocean between Western Europe and the United States. The antenna 11 would preferrably be of the type to provide spectrum re-use using orthogonal linear polarization like that, for example, described in U.S. Pat. No. 3,898,667 of Raab. A description of a more recent version of the dual-gridded reflector structure is described in allowed U.S. application Ser. No. No. 661,163 filed Oct. 15, 1985 U.S. Pat. No. 4,625,214 for Sharad V. Parekh. These references are incorporated herein by reference.

For trans-Atlantic satellites, it is desirable to achieve local vertical and horizontal polarization particularly in both the Southeastern United States and the Mediterranean region which are the highest rain rate regions. In accordance with the preferred embodiment, the center of these high rain rate regions in the Southeastern United States is selected as Pensacola, Florida at 30 North latitude and 87 West longitude. The center of the high rain rate region in Europe is selected as Rome, Italy at 42 North latitude and 13 East longitude. The CCIR-approved formula used to calculate the polarization rotation between the satellite and earth station is given by equation 1:

$$\phi_P = \tan^{-1} \frac{\sin (\lambda_E - \lambda_S)}{\tan \alpha_E} \quad (1)$$

where $\lambda^E$ equals earth station longitude, $\lambda^S$ equals satellite longitude and $\alpha^E$ equals earth station latitude. For a satellite located at point A above 56° West longitude the calculations for an earth station 101 at Pensacola show that the polarization rotation angle into Pensacola is −41.74° while for an earth station 103 at Rome the calculation shows that the polarization rotation into Rome is +46.04°. Thus, if the satellite's antenna at point A was oriented such that vertical linear polarization was aligned with the orbit normal and the horizontal linear polarization was aligned with the spacecraft's velocity vector, the signals would arrive in the high rain rate range regions at angles which would result in nearly the greatest depolarization effect. The vertical polarization signal (aligned with orbit normal) sent from point A, would rotate at −41.74° when it reached the high rain rate region in Pensacola. It is known that minimum cross-coupling of signals from one polarization to the orthogonal polarization occurs when the signals passing through the precipitation or other moisture are parallel to the local vertical or local horizontal. At nearly 45° the signals would be highly coupled into the orthogonal polarization. Similarly, signals sent to a station located in Rome would undergo +46.04° polarization rotation and again be passing through moisture in a direction that would result in maximum cross-coupling.

In accordance with the teachings of the present invention to overcome this effect the satellite polarization is rotated at point A to result in a polarization arrival angles at the earth stations 101 and 103 at both the Pensacola and Rome that are closer to local horizontal and vertical. This situation can occur if the antenna is oriented such that the polarization A signal, for example, is rotated 45° from the orbit normal as represented by vector 31 in FIG. 1 and the polarization B signal is rotated to position 33 which is 45° off from the spacecraft's velocity vector. This orientation may be provided by fixing the antenna orientation at this skew angle about the spacecraft body's yaw axis. Note that as the satellite's polarization A arrives at the Pensacola earth station 101 it is rotated back toward orbit normal by the −41.74° to put it almost at local vertical as represented by vector 41 in FIG. 1. Similarly, the polarization B represented by vector 33 when it arrives at the Pensacola earth station 101 is nearly on the local horizontal as indicated by vector 43. The same polarization A transmitted from the satellite 10 at 45° off orbit normal undergoes a +46.04° rotation to the Rome earth station 103 to put polarization A nearly horizontal as indicated by vector 51 in FIG. 1. The polarization B signal transmitted at the +45° rotation at the satellite also undergoes the +46.04° rotation to the Rome earth station 103 and arrives only about one degree off the local vertical as indicated by vector 53 in FIG. 1. In accordance with the system by rotating the satellite antenna polarization 45° off the orbit normal one is able to compensate for the rotation and thus provide signals that arrive nearly at local vertical or local horizontal at the high precipitation regions and minimize cross coupling of signals from the two orthogonal linear polarizations. As is inherent in the design of this system, it should be noted that the polarization A signal that is sent from satellite 10 at point A arrives as a vertical polarized signal at the eastern part of the United States and arrives as a horizontally polarized signal at Western Europe. Similarly, the polarization B signals which arrive as horizontally polarized signals at the eastern portion of the United States appear as vertically polarized signals at Western Europe.

Figure 2A:
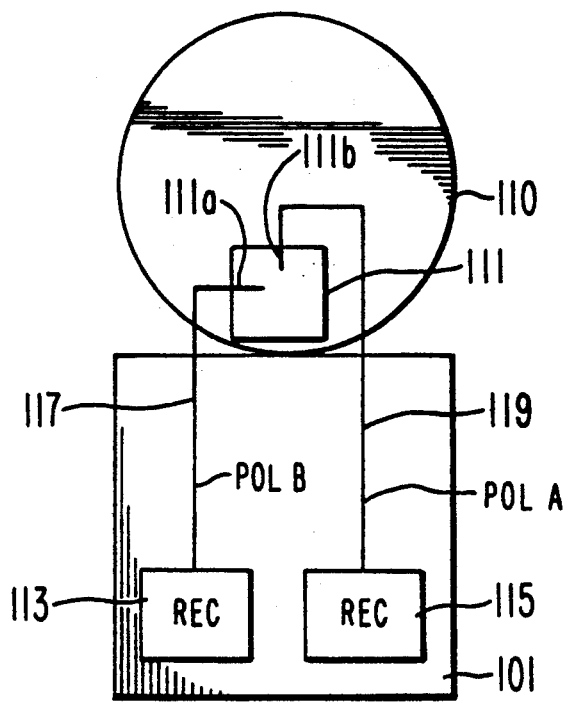
FIGS. 2A and 2B illustrate the earth stations in FIG. 1.
Figure 2B:
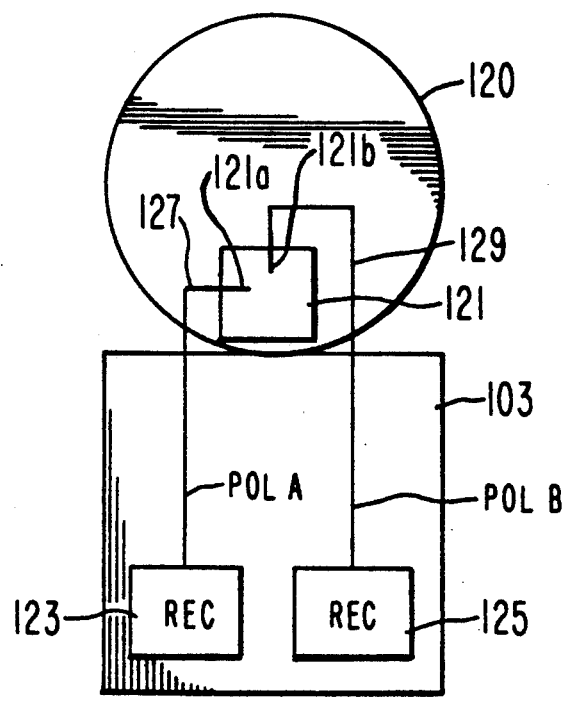

Referring to FIGS. 2A and 2B there is illustrated schematically earth stations 101 and 103 respectively. The earth station 101 includes a parabolic reflector 110, a horn 111 at the focus of reflector 110, a first receiver 113, a second receiver 115, and coupling lines 117 and 119. The horn 111 includes a horizontal pick-up probe 111a extending at local horizontal in horn 111 to be the pick-up element for the horizontally polarized signals or the polarization B (POL B) signals from the satellite. The polarization B signals are applied to receiver 113 at earth station 101 via coupling line 117. The horn 111 also includes a vertical pick-up element 111b for the vertically polarized signals or the polarization A (POL A) signals from the satellite. The polarization A signals are applied to receiver 115 via coupling line 119.

Similarly, as shown in FIG. 2B, the earth station 103 includes a parabolic reflector 120, a horn 121, a first receiver 123, a second receiver 125 and coupling lines 127 and 129. The horn 121 includes a horizonal pick-up element 121a extending in horn 121 to be the pick-up element for the horizontally polarized signals or polarization A signals from the satellite. These polarization A signals are applied to receiver 123 via line 127. The horn 121 also includes the vertical pick-up element 121b to be the pick-up element for the vertically polarized signals or the polarization B signals from the satellite. These polarization B signals are applied to receiver 125 via line 129.

Figure 3:
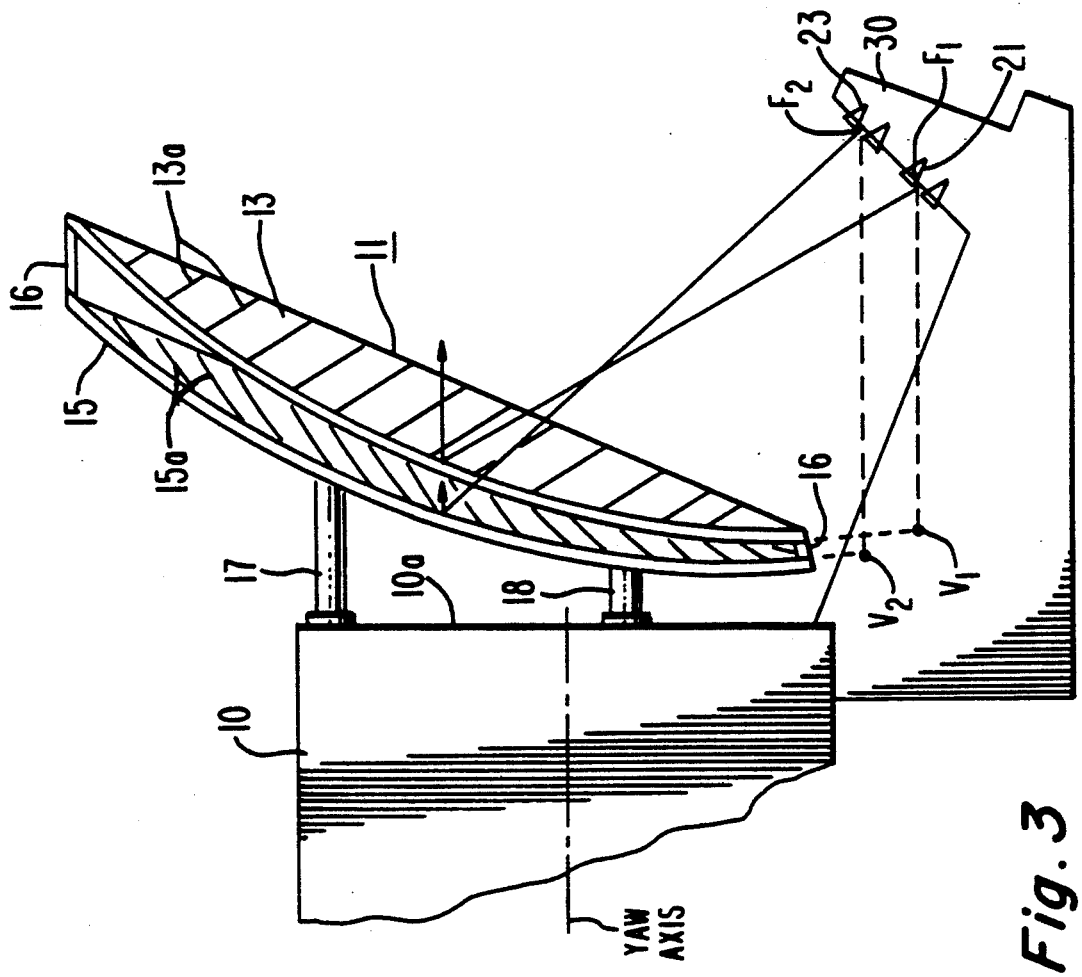
FIG. 3 is a cross-section of a satellite antenna of the type used in the system of the present invention.

Referring to FIG. 3 there is an illustrated cross section of a satellite antenna 11 according to a preferred embodiment of the present invention. The communication's antenna reflector assembly 11 comprises the first parabolic dish 13 including a grid of diagonally polarized parallel conductors 13a mounted over a second parabolic reflector 15 comprising a grid of diagonally polarized conductors 15a oriented orthogonal to the grid of conductors 13a. The reflector assembly 11 is mounted to the satellite 10 via the posts 17 and 18 so the signals are transmitted and received along the yaw axis direction. The satellite yaw axis points directly to earth and consequently the antenna points to earth.

In accordance with the present invention and the present example of 45° skewing of the antenna relative to orbit normal, the reflector assembly 11 is mounted with the assembly 11 rotated 45° about the yaw axis so the conductors 15a are 45° from satellite local vertical and conductors 13a are 45° from satellite local horizontal.

The vertex of the parabolic reflector 13 is located at $V_1$ and the vertex of the second reflector 15 is located at $V_2$. The two parabolic reflectors are mounted offset from each other such that as shown by the vertex points $V_1$ and $V_2$, the focal axes (dashed lines) are slightly offset and parallel to each other. This is in correspondence with the above mentioned Raab patent.

Figure 4:
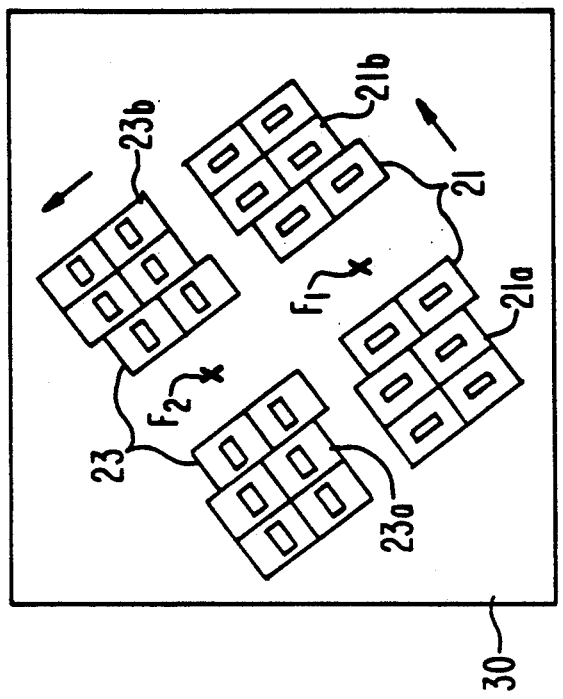
FIG. 4 illustrates the feed horns of the antenna of FIG. 2.

In accordance with the preferred embodiment of the invention there is an array of feed horns for each polarization for providing beam shaping to achieve the desired split patterns 20a and 20b shown in FIG. 1 for covering both Western Europe and Eastern United States. This beam shaping using common feed horns clustered to provide this coverage follows in accordance with U.S. Pat. No. 3,541,553 of S. Gubin. In FIG. 2, the array of horns 21 is mounted at the focus $F_1$ of the parabolic reflector 13 using mount 30. As shown in FIG. 4, the horns 21 are in separated clusters 21a and 21b to achieve split patterns 20a and 20b. The horns 21 are generally centered with respect to the focus point $F_1$ as illustrated. The horns 21 are rotated 45° to match reflector conductors 13a. The array of horns 23 are in separated clusters 23a and 23b to achieve split patterns 20a and 20b. The horns 23 are mounted using mount 30 with the array center at the focus point $F_2$ for the reflector 15. The horns 23 are rotated 45° to match conductors 15a. Both array of horns point to the center of their parabolic reflectors to fully illuminate them primarily at the center. The mount 30 includes the coupling network to the electronics in the spacecraft.

I claim:

1. A satellite communication system for operating over two widely separated land areas such as those land areas separated by an ocean, said land areas having a relatively heavy precipitation region comprising:
a first ground station located in the heavy precipitation region of a first of said land areas;
a second ground station located in the heavy precipitation region of a second of said land areas;
each of said ground stations including antenna means for receiving orthogonal linearly polarized signals in their local vertical or horizontal orientations;
a satellite located in orbit above an earth longitude somewhere between the longitude of the first and second land areas and including a satellite antenna for transmitting and receiving orthogonal linearly polarized signals which antenna includes means for radiating orthogonal linearly polarized RF signals;
said satellite antenna being oriented and arranged such that the first linearly polarized signals transmitted from the satellite antenna at the satellite location are oriented an acute angle off orbit normal and the second linearly polarized signals transmitted from the satellite are oriented orthogonal to the first linearly polarized signals;
means at the first ground station for receiving said first polarized signals as local vertical signals and second polarized signals as local horizontal signals and means at said second ground station for receiving said first polarized signals as local horizontal signals and said second polarized signals as vertical signals.

2. The method of claim 1 wherein said acute angle $\phi_P$ is determined generally by:

$$\phi_P = \tan^{-1}\frac{\sin(\lambda_E - \lambda_S)}{\tan\alpha_E}$$

where
$\lambda_E$ equals the first ground station longitude
$\lambda_S$ equals the satellite longitude
$\alpha_E$ equals the first ground station latitude.

3. The method of claim 1 wherein said acute angle is about 45°.

4. The method of claim 1 wherein said acute angle is dependent upon the longitude of said satellite and said first and second ground stations.

5. A method for providing satellite spectrum reuse communications between at least two earth stations located between widely separated land areas using an orthogonal linearly polarized antenna at the ground stations and at the satellite comprising the steps of:
placing the satellite in geostationary orbit in a longitude position between said land areas;
transmitting from the satellite's antenna first and second linearly polarized signals orthogonal to each other and at an acute angle off the satellite's local orbit normal dependent on the longitude of the satellite with respect to the longitude of the separated earth stations;
receiving at the first of the earth stations located in the one of the land areas local vertically polarized signals as said first linearly polarized signals transmitted from the satellite and said local horizontally polarized signals as second linearly polarized signals; and
receiving at the second of said earth stations located in the other land areas said local horizontally polarized signals as said first linearly polarized signals and said local vertically polarized signals as said second linearly polarized signals.

6. The method of claim 5 wherein said acute angle is about 45°.

7. A trans-Atlantic satellite communication system comprising:
a first earth station located somewhere in the eastern portion of the North American continent;
a second earth station located in somewhere in Western Europe;
said earth stations each including means for receiving orthogonal linearly polarized signals at the local vertical or horizontal orientations;
a satellite located in orbit above a longitude somewhere between the longitude of the first and second earth stations and including a satellite antenna for transmitting and receiving orthogonal linearly polarized signals;
said satellite antenna being oriented such that the first of said linearly polarized signals transmitted from the satellite at the satellite location are oriented about 45° off orbit normal and the second of said linearly polarized signals transmitted from the satellite at the satellite location are oriented orthogonal to said first linearly polarized signals;
means at the first ground station for receiving said first polarized signals as local vertical signals and second polarized signals as local horizontal signals and means at said second ground station for receiving said first polarized signals as local horizontal signals and said second polarized signals as local vertical signals.

8. A method for providing satellite spectrum reuse communications between earth stations located in United States and Western Europe using an orthogonal linear polarized antenna system at the ground stations and at the satellite comprising the steps of:
placing the satellite in geostationary orbit in a longitude position near midpoint between said United States and Western Europe ground station locations;
orienting the satellite's antenna system to radiate orthogonal linearly polarized signals about 45° of the orbit normal;
receiving at a ground station located in the United States the local vertically polarized signals as a first of said orthogonal linearly polarized signals transmitted from the satellite and the local horizontally polarized signals as a second of said orthogonal linearly polarized signals; and
receiving at said second ground station located in Europe the local horizontally polarized signals as said first linearly polarized signals and said local vertically polarized signals as said second linearly polarized signals.

* * * * *

UNITED STATES PATENT AND TRADEMARK OFFICE
CERTIFICATE OF CORRECTION

PATENT NO. : 5,023,619

DATED : June 11, 1991

INVENTOR(S) : Joseph F. Balcewicz

It is certified that error appears in the above-identified patent and that said Letters Patent is hereby corrected as shown below:

Column 1, line 33, "14.8 OHz" should be --14.8 GHz--.

Column 2, line 57, "$\lambda^E$" should be --$\lambda_E$--.

Column 2, line 57, "$\lambda^S$" should be --$\lambda_S$--.

Column 2, line 58, "$\alpha^E$" should be --$\alpha_E$--.

Column 6, line 50, "45° of" should be --45° off--.

Signed and Sealed this

Twenty-ninth Day of September, 1992

Attest:

DOUGLAS B. COMER

Attesting Officer

Acting Commissioner of Patents and Trademarks